United States Patent [19]

Frania et al.

[11] Patent Number: 4,755,196

[45] Date of Patent: Jul. 5, 1988

[54] AIR-DRYING APPARATUS

[75] Inventors: Josef Frania, Hanover; Wilhelm Haak, Wennigsen; Erich Seewald, Langenhagen, all of Fed. Rep. of Germany

[73] Assignee: WABCO Westinghouse Fahrzeugbremsen GmbH, Hanover, Fed. Rep. of Germany

[21] Appl. No.: 880,237

[22] Filed: Jun. 30, 1986

[30] Foreign Application Priority Data

Jun. 29, 1985 [DE] Fed. Rep. of Germany ....... 3523403

[51] Int. Cl.$^4$ ............................................. B01D 53/04
[52] U.S. Cl. ....................................... 55/163; 55/316; 55/387
[58] Field of Search .................... 55/31, 33, 35, 62, 74, 55/161–163, 179, 316, 387

[56] References Cited

U.S. PATENT DOCUMENTS

| 3,038,487 | 6/1962 | Gardner | 137/112 |
|---|---|---|---|
| 3,080,693 | 3/1963 | Glass et al. | 55/62 X |
| 3,279,151 | 10/1966 | Kauer, Jr. et al. | 55/62 X |
| 3,324,631 | 6/1967 | Kreuter | 55/163 |
| 3,472,000 | 10/1969 | Glass et al. | 55/163 |
| 3,507,097 | 4/1970 | Crowley et al. | 55/163 X |
| 3,572,008 | 3/1971 | Hankison et al. | 55/62 X |
| 3,902,875 | 9/1975 | Bridigum et al. | 55/179 X |
| 4,007,021 | 2/1977 | Gyllinder | 55/62 X |
| 4,026,685 | 5/1977 | Grix | 55/213 |
| 4,047,909 | 9/1977 | Hofmann | 55/DIG. 17 |
| 4,153,434 | 5/1979 | Settlemyer | 55/179 X |
| 4,322,228 | 3/1982 | Myers et al. | 55/163 |
| 4,361,425 | 11/1982 | Hata | 55/218 |
| 4,504,081 | 3/1985 | Shimizu et al. | 55/DIG. 17 |
| 4,544,385 | 10/1985 | Tanaka | 55/316 X |
| 4,572,725 | 2/1986 | Kojima | 55/316 X |

FOREIGN PATENT DOCUMENTS

| 53850 | 6/1982 | European Pat. Off. |
| 2330291 | 1/1974 | Fed. Rep. of Germany . |
| 7319539 | 5/1974 | Fed. Rep. of Germany . |
| 7710321 | 8/1977 | Fed. Rep. of Germany . |
| 2715936 | 10/1978 | Fed. Rep. of Germany . |
| 1947550 | 12/1980 | Fed. Rep. of Germany . |
| 3011725 | 9/1982 | Fed. Rep. of Germany . |
| 3213236 | 6/1983 | Fed. Rep. of Germany . |
| 3216329 | 11/1983 | Fed. Rep. of Germany . |
| 3216395 | 11/1983 | Fed. Rep. of Germany . |
| 3224937 | 1/1984 | Fed. Rep. of Germany . |
| 3302451 | 7/1984 | Fed. Rep. of Germany . |
| 3311682 | 10/1984 | Fed. Rep. of Germany . |

OTHER PUBLICATIONS

A. Reppich, "Lufttrocknung in Nutzfahrzeug-Bremsanlagen", O+p Olhydraulik and Pneumatik-28 (1984), Nr. 1, pp. 40–43.
W. Deppert, Pneumatische Steuerungen, pp. 68 and 69 (1981).
WABCO Automotive Products Group brochure dated 7/1982, pp. 14–17 and 105.
Patent Abstracts of Japan, Nos. 58-210825, 59-22627, 59-32920 and 59-66326.

Primary Examiner—Robert Spitzer
Attorney, Agent, or Firm—G. E. Hawranko

[57] ABSTRACT

An air-drying apparatus for use with compressed air-operated systems such as, for example, a vehicle suspension system, includes a housing having an inlet portion, a drying material portion, and an outlet portion. An activation piston is disposed within the inlet portion and is influenced by an operating compressed air in an operating phase, and is movable under the influence of a regenerative compressed air to open an exhaust valve during a regenerative phase. A throttle bypass opening between the inlet portion and drying material portion allows a secondary regenerative compressed air to contact the activation piston, thereby achieving a standby phase. An inlet check valve having a deflectable sealing lip portion is also formed on the activation piston. A discharge valve is disposed in the outlet portion to control the flow of compressed air to and from the vehicle-operating systems.

12 Claims, 2 Drawing Sheets

AIR-DRYING APPARATUS

BACKGROUND OF THE INVENTION

This invention relates to an apparatus for drying a gaseous fluid under pressure, such apparatus as can be particularly utilized in fluid-pressure-operated systems for a vehicle having operating subsystems, such as a wheel-suspension system whose level changes as a function of the wheel load, or any other subsystem in which the consuming device is operated under variable volumes or a variable pressure.

One type of air-drying apparatus known in the art is described in the German Pat. No. DE 33 11 682, specifically in FIG. 2, which illustrates the air-drying apparatus having a switching arrangement with an activation piston which, when activated by a control fluid pressure, opens a discharge valve, and thereby initiates a regeneration phase. When the control fluid pressure is removed, the activation piston is retracted by a return spring, whereupon the discharge valve is closed and the normal operating phase is reestablished. The disadvantage with such an arrangement is that the control pressure must be separately-provided in order to switch from the normal operating phase to the regeneration phase. In the alternative, if the control fluid pressure were taken from the consuming device downstream of the air-drying apparatus, there must still be an external-line connection parallel to the air-drying apparatus, which not only increases installation costs, but also serves as a source of potential failure and maintenance problems.

Additionally, known air-drying apparatus typically operate at two distinct phases—the normal operating phase and the regenerative phase. In the normal operating phase, fluid pressure from a fluid pressure supply flows through the air-drying apparatus where the moisture in that fluid pressure is removed, to the fluid pressure consuming device which, in this example, is a vehicle having several fluid-pressure-operated subsystems including: the wheel-suspension system, the door-operating system, and the power-assist transmission. In the regeneration phase, fluid pressure from the fluid pressure supply is interrupted (either accidentally or intentionally), an outlet or exhaust valve is closed, and a fluid pressure supplied to the fluid pressure consuming device flows back through the air-drying apparatus and is re-dryed.

It would be a distinct advantage if a third phase of operation were available, such third phase corresponding to a standby phase, where the fluid pressure flow is naturally interrupted and the fluid pressure level at the input of the air-drying apparatus is nevertheless maintained. With the capability of the air-drying apparatus to operate at three distinct operating phases, the fluid pressure supply to the wheel-suspension system, for instance, allows for the wheel-suspension system to be filled during the normal operating phase, to be lowered or reduced in the regeneration phase, and to be maintained at the desired height in the standby phase.

Other known air-drying apparatus, which utilize an activation piston for operating a discharge valve, have further included a return spring for the replacement of the activation piston to its original position. Not only is such feature costly in terms of additional elements and machining of spring seats, but such feature is also prone to wear problems, such as fatigue of the spring, and to problems of alignment to keep the activation piston moving in the proper direction.

It is a further requirement for the fluid pressure system in which the air-drying apparatus operates to (in the regeneration phase) prevent the fluid pressure level in the consuming device from falling below a predetermined safety level. One method for controlling the reduction of fluid pressure in the consuming device (a method known in the prior art) is to place a throttling arrangement between the output device and the air dryer. This approach, however, has the disadvantage that another external means must be provided to interrupt the flow of fluid pressure out of the consuming device, since the air-drying apparatus merely limits such flow.

SUMMARY OF THE INVENTION

It is therefore an object of the invention to provide an air-drying apparatus having an uncomplicated construction, and being of a simple design so as to eliminate the expense of an external connection for a control fluid pressure.

It is a further object of the invention to provide such an air-drying apparatus which includes a standby operating phase, where the fluid pressure level in the consuming device is maintained at a specific value.

It is yet a further object of the invention to provide such an air-drying apparatus having an activation piston which is replaced to an original position by an equilibrium of forces acting on either side thereof.

Still another object of the invention is to provide such an air-drying apparatus which eliminates the need for a return spring to replace an activation piston to its normal position, such activation piston functioning as a part of the discharge valve.

An even further object of the invention is to provide such an air-drying apparatus which, during the regeneration phase, operates to prevent the reduction of fluid pressure in the consuming device below a predetermined level.

Briefly, the invention consists of a housing having an inlet section, a drying material section, and an outlet section. Disposed in the inlet section is an activation piston having an outwardly-extending sealing portion which, when fluid pressure is presented to the input of the air-drying apparatus, such fluid pressure deflects the seal to allow fluid pressure to flow thereover, which then passes through a channel to the drying material. The activation piston also forms a portion of an exhaust valve, which is opened when the fluid pressure is interrupted by a regeneration fluid pressure, which is fluid pressure flowing back through the drying material portion. A throttle passageway is formed upstream of the check valve and exhaust valve, and is effective to allow a secondary regeneration fluid pressure to flow back and act on the activation piston such that the exhaust valve can be closed and a standby phase achieved, such standby phase corresponding to a condition of maintaining the fluid pressure level in the consuming device. A throttle check valve, having a throttle opening to allow fluid-flow back from the consuming device in a throttled manner, is disposed in the outlet section. As an alternate outlet section embodiment, the throttle check valve or discharge valve can include a control element, which has a sealing element circumferentially-disposed around a portion thereof. This control element, sealing element arrangement can control the flow of fluid pressure through a throttle passageway, depending on the operating phase of the system.

DESCRIPTION AND OPERATION

Figure 1:
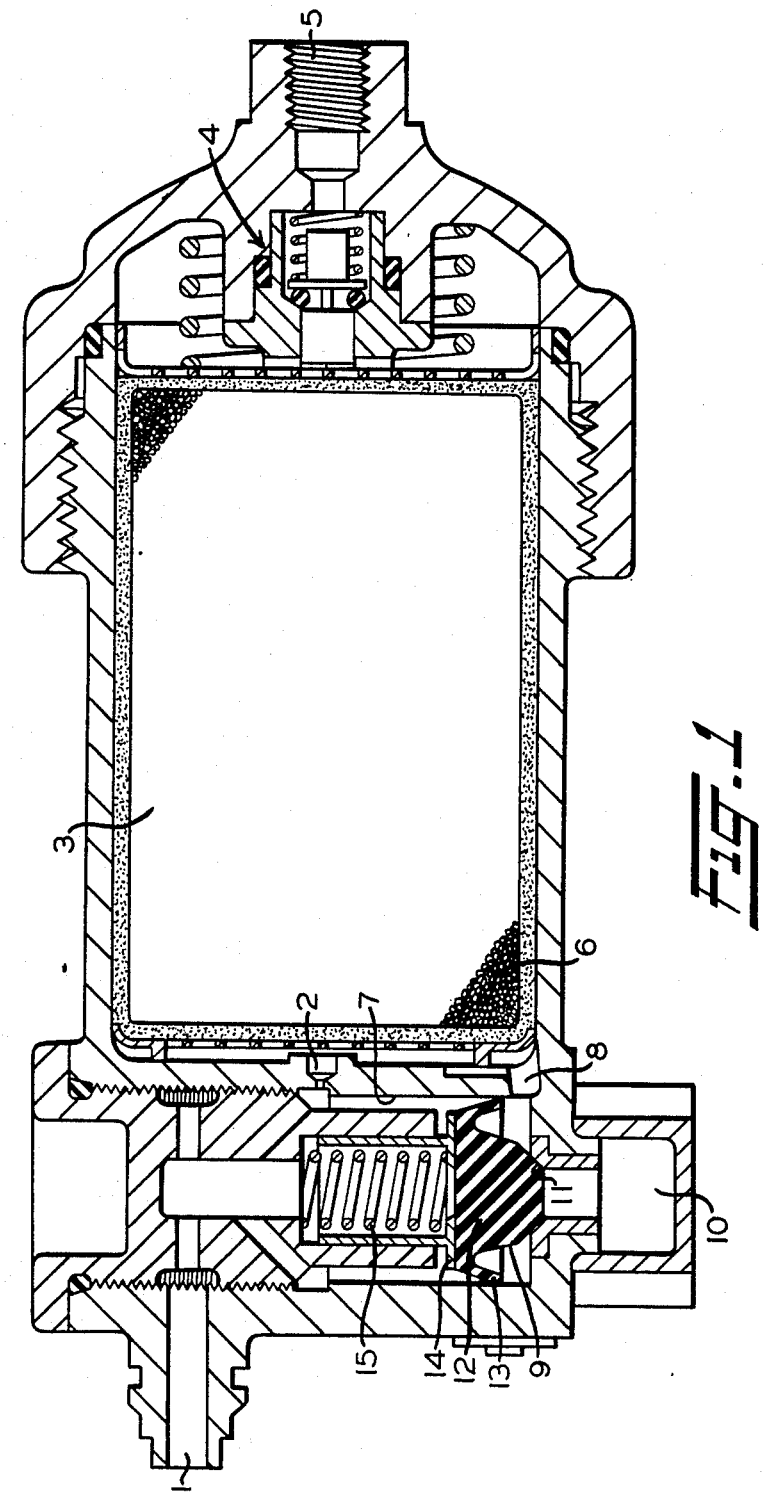
FIG. 1 is an elevational view, in section, of an air-drying apparatus constructed in accordance with the invention.

As shown in FIG. 1, in the air-drying apparatus for drying a fluid pressure, a compressed air current can flow from an input 1 through a drying means 6, which contains a desiccant and is designed in accordance with the prior art, to an output 5. In a housing channel 7, located between the input 1 and the drying means 6, there is an activation piston 12 which can be moved longitudinally. The activation piston 12 is provided with a sealing element which exhibits a circular sealing lip 13. The sealing lip 13 is designed so that it can come in contact with the wall of the housing channel 7. It is pressurized by a fluid pressure which acts on it from the direction of the drying means 6 and by the compressed air current coming from the direction of the input 1, provided that its pressure is high enough, against the abovementioned contact force; it can be raised over at least a part of its circumference from the housing channel 7. In this manner, the sealing lip forms, with the housing channel 7 and the activation piston 12, a check valve (7, 12, 13) which permits the flow of the fluid pressure from the input 1 to the drying means 6, through channel 7 and passageway 8 and blocks the opposite direction. The valve body of this check valve (7, 12, 13) also includes the activation piston 12. Downstream of the check valve (7, 12, 13), a passageway 8 runs off the housing channel 7 to a drying means chamber 3, which contains the drying means 6.

Located on the terminal surface of the housing channel 7 downstream of the check valve (7, 12, 13), there is an exhaust valve seat 11, oriented coaxially with the activation piston 12 and rigidly-mounted with the housing, by means of which the activation piston 12 forms an exhaust valve 11, 12, and via which the passageway 8 and thus the drying means chamber 3 can be connected with an exhaust line 10.

The activation piston 12 is pressurized or urged on a first or top side 14, toward the closing direction of the exhaust valve 11, 12, by the pressure of the incoming compressed air flow; and on a second or bottom side 9, toward the opening direction of the exhaust valve 11, 12 via the passageway 8, by the pressure in the drying means chamber 3, whereby the drying means chamber 3 represents a point of the apparatus located downstream of the input 1.

A closing spring 15 acting on the top side 14 of the activation piston 12, the other end of which is braced in the housing channel 7, applies tension to the activation piston 12 in the closing direction of the outlet valve 11, 12, but it is not of a sufficient spring strength to influence movement of the activation piston 12 over the forces of the competing fluid pressures.

In a housing wall (not shown in any great detail and separating the drying means chamber 3 and the input 1), there is a calibrated opening which represents a throttle bypass 2, the operation of which will be described hereinafter in further detail.

Between the discharge opening of the drying means chamber 3 and the output of the air dryer, there is a throttle check valve 4 which carries the entire flow of the compressed air from the drying means chamber 3 to the output 5 in the known manner, and which allows a backflow via a hole 4a provided in its valve body.

When installed, the above-mentioned air dryer is connected to the input 1 with a compressed air source (not shown), preferably a compressor, and at the output 5 with a consumer (not shown) which, for its part, can consist of several consumer circuits. In the above-mentioned connections, and in the connections within the consumer system, there can be switching and/or regulation and/or control devices which are all included by the term "switching devices" below. In the case of a wheel-suspension system, the switching devices can be activated by a logic system, which acts as a function of the level of the vehicle superstructure.

In an operating phase, the compressed air source conveys the flow of compressed air to the input 1. The major portion of the compressed air flows through the housing channel 7, via the check valve (7, 12, 13) and the passageway 8; whereas, a secondary current flows through the throttle bypass 2 into the drying means chamber 3. After the compressed air flows through the drying means 6, the now completely or essentially dry compressed air current flows through the throttle check valve 4 and the output 5 into the consumer system (not shown). If the compressed air current is interrupted, which can be the accidental or intentional consequence of an interruption of the transmission by the compressed air source or an interruption of the connection between the compressed air source and the input 1 by the activation of a switching device, then the activation piston 12 is displaced upward by the prevailing pressure in the drying means chamber 3 (which acts on its bottom side 9) and the exhaust valve 11, 12 opens, and a regeneration phase is thereby introduced for the regeneration; that is, the re-drying of the drying means 6.

In this regeneration phase, the pressure in the drying means chamber 3 has dropped on account of the opening of the exhaust valve 11, 12. Through the throttle in the throttle check valve 4, a regeneration air current now flows out of the consumer (not shown) as the regeneration fluid flows back through the drying means 6. The value to which the fluid pressure in the drying means chamber 3 drops in this phase is a function of the cross-sectional areas of the throttle of the throttle check valve 4 and the exhaust valve 11, 12. In the normal case, these cross-sectional areas are designed so that this fluid pressure, except for a pressure-increase caused by the closing spring 15 and except for flow-losses in the apparatus, essentially corresponds to the atmospheric pressure or, generally speaking, to the fluid pressure in an unpressurized (surge) tank for the fluid pressure. For the regeneration of the drying means, the largest possible pressure-drop in the regeneration fluid flow is desirable, since the regeneration fluid flow becomes dryer with an increasing pressure-drop (i.e., its relative humidity decreases) and the regeneration becomes more intense.

The regeneration compressed air current flows primarily through the exhaust valve 11, 12 and an exhaust line 10 to the atmosphere; while a secondary regeneration air current flows through the throttle bypass 2, the input 1, and an open path in the fluid pressure source (not shown) and/or any switching devices which may be present to the atmosphere. If this path is closed, then the secondary regeneration air current builds up pressure on the top side 14 of the activation piston 12; which, in combination with the closing spring 15, displaces the activation piston 12 in relation to the outlet 11 and thereby closes the exhaust valve 11, 12. The regeneration phase is thereby ended, whereupon the air-drying apparatus achieves its standby phase. The operating phase can be repeated following the standby phase.

The regeneration phase can also be continued directly into the operating phase by a resumption of the transmission by the compressed air source (not shown) or by activating the switching device (not shown) in the sense of a reestablishment of the connection between the compressed air source and the input 1.

It should also be noted that the air-drying apparatus operates even without the throttle bypass 2. However, in this case, such an arrangement is achieved only if we can accept the presence of a steady regeneration air current and thus a steadily-increasing pressure-drop in the consumer system, until the production of compressed air resumes, if necessary after the appropriate activation of the switching device; that is, without the throttle bypass 2, the standby phase cannot be achieved.

Figure 2:
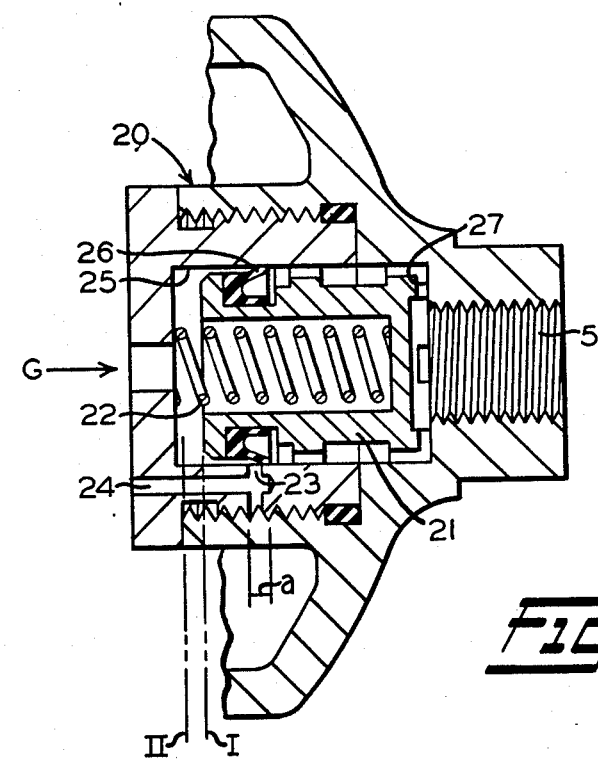
FIG. 2 is an elevational view, in section, of an alternate embodiment of the outlet section of the air-drying apparatus shown in FIG. 1.

FIG. 2 shows a valve apparatus 20, which can take the place of the throttle check valve 4 shown in FIG. 1.

The valve apparatus 20 consists of a check valve 21, 25, 26, formed by a second sealing lip 26 surrounding a control element 21 with a guide 25. The second sealing lip 26 with reference to the pressures acting on it corresponds to its action, in combination with the guide 25, to that of the check valve (7, 12, 13) described above.

In the housing, corresponding to the valve apparatus 20, there is a throttle channel 23, 24 which empties into a section "a" of the guide 25.

The control element 21 is prestressed in the rightward direction of the compressed air current, as shown in FIG. 2, by a pressure-safety spring 22, and can be displaced along the axis of the compressed air current in the guide 25 into two positions I and II. The displacement distance between the first and second positions I and II corresponds to the length of the section (a). The second sealing lip 26, therefore, travels over the south of the throttle channel 23, 24 into the section (a) when the control element 21 is displaced between the first and second positions I and II by the second sealing lip 26.

In the operating phase, the control element 21 is displaced by the compressed air current in combination with the pressure-return spring 22 into the first position I, against a housing stop 27 located in the vicinity of the output 5, and not illustrated in further detail. In this position, the check valve 21, 25, 26 carries some flow directly, and some via the throttle channel 23, 24 of the compressed air current.

If the compressed air current is interrupted, the fluid pressure inside the air dryer, ahead of the control element 21, drops (as described above) essentially to atmospheric pressure. The control element 21 is thereby displaced by the pressure of the consumer system (not shown), which now reacts via the output 5 and prevails, into the second position II. The second position II can be defined, depending on the design of the pressure-return spring 22, by a housing stop or by an equilibrium on the control element 21 between the force of the pressure-return spring 22 and the pressure at the output 5. In this position of the control element 21, the regeneration air current can flow back through the throttle channel 23, 24, into the drying means 6, and can continue to flow from there, as described above. The throttle channel 23, 24 thereby exerts the above-mentioned pressure-reducing action of the throttle check valve.

The internal pressure also cooperates in the formation of the above-mentioned equilibrium, but its contribution is negligible on account of the throttling to essentially atmospheric pressure.

If the pressure at the output 5, and thus in the consumer system (not shown), has dropped to a point at which its action on the control element 21 is overcome by the pressure-return spring 22 (and the negligible pressure inside), the control element 21 is pushed back into its first position I so that the throttle channel 23, 24 for the regeneration air current closes, and the regeneration phase and the pressure-drop at the output 5 and in the consumer system ends. The pressure which now prevails, and is maintained at the output 5 and in the consumer system, is the predetermined minimum pressure. The air dryer is now in the standby phase.

The control element 21 remains in this position I, even when the air current resumes.

On the basis of the operation described above, the valve apparatus 20, together with the control element 21, the second sealing lip 26, and the guide 25 (specifically the section (a)) also represent a multi-way valve for the throttle channel 23, 24.

The configuration illustrated in FIG. 2, therefore, protects the consumer system (not shown), even when the compressed air current is interrupted, against a drop in pressure below a predetermined minimum pressure determined by the characteristics of the pressure-return spring 22, which pressure is at the same time the minimum pressure of the consumer system. This action is not only important for the regeneration phase and in the standby phase, it also offers protection when there are extended interruptions in the flow of compressed air; e.g., when the vehicle in question is stopped, and when there are leaks in the air-drying apparatus or in the compressed air source and/or in the switching devices and/or in the corresponding connecting lines.

It is apparent that the embodiments described above, as well as the above-mentioned configuration, do not exhaustively describe the range of application of the present invention.

Specifically, multi-way valves and check valves of a valve apparatus, as combined in FIG. 2, can also be installed separately, although the disadvantage there is the greater space requirement and the higher production costs. An apparatus according to the invention, can also exhibit other components, e. g., a filter element for solid contaminants.

We claim:

1. A gas drying apparatus for use with compressed fluid operated systems operable to at least a normal operating and a regenerative phase, said apparatus comprising:
    (a) a housing having an inlet portion, a drying material portion, and an outlet portion;
    (b) an activation piston disposed in an inlet chamber formed in said inlet portion;
    (c) a passageway formed between said inlet portion and said drying material portion, downstream of said activation piston, so as to allow communication of an operating compressed gaseous fluid to said drying material portion, therethrough;
    (d) an exhaust valve disposed in said inlet portion having a valve body element formed by a portion of said activation piston, and a valve seat formed adjacent an exhaust opening, said valve body being urged onto said valve seat by said operating compressed fluid from the inlet side during such normal operating phase, thereby closing said exhaust valve, said valve body further being urged off of said valve seat to open said exhaust valve following interruption of said operating compressed fluid as occurs during such regenerative phase by a regenerative fluid flowing back from the compressed fluid operated systems through said drying material portion and to said exhaust opening, which is at a reduced pressure; and (e) said drying material portion having a drying chamber formed therein which contains a desiccant material.

2. An apparatus, as set forth in claim 1, further comprising a check valve formed partially on a portion of said activation piston and partially by a portion of said inlet chamber, said check valve being opened during such normal operating phase by introduction of such operating compressed fluid.

3. An apparatus, as set forth in claim 2, wherein said check valve is disposed in said inlet portion upstream from said exhaust valve, said check valve portion formed on said activation piston being located above said valve body portion of said exhaust valve in relation to such operating compressed fluid flowing thereover.

4. An apparatus, as set forth in claim 2, wherein said check valve portion formed on said activation piston is a sealing lip circumferentially-disposed around a portion of said activation piston, said sealing lip being prestressed so as to be deflectable during such normal operating phase as such operating compressed fluid flows thereover, said sealing lip further being reflectable so as to contact said inlet chamber when such operating compressed fluid is interrupted.

5. An apparatus, as set forth in claim 1, further comprising a bypass throttle passageway formed between said inlet portion and said drying material portion, upstream of said activation piston and effective such that a secondary regenerative fluid flows into and accumulates in said inlet chamber to a level sufficient to urge said activation piston to a position closing said exhaust valve which, together with an interruption of such operating compressed fluid, establishes a standby phase which corresponds to a maintenance of a predetermined amount of fluid pressure in the fluid operated systems.

6. An apparatus, as set forth in claim 5, further comprising a check valve formed partially on a portion of said activation piston and partially by a portion of said inlet chamber, said check valve being opened during such normal operating phase by introduction of such operating compressed fluid.

7. An apparatus, as set forth in claim 6, wherein said check valve portion formed on said activation piston is a sealing lip circumferentially-disposed around a portion of said activation piston, said sealing lip being prestressed so as to be deflectable during such normal operating phase as such operating compressed fluid flows thereover, said sealing lip further being reflectable so as to contact said inlet chamber when such operating compressed fluid is interrupted.

8. An apparatus, as set forth in claim 1, further comprising a discharge valve means formed in said outlet portion for communicating such operating compressed fluid to the compressed fluid operated systems during such normal operating phase, and for communicating such regenerative air to such opened exhaust valve during such regenerative phase.

9. An apparatus, as set forth in claim 8, wherein said discharge valve means is a throttle-type check valve which provides a larger flow opening in a direction toward the fluid operated systems, than in a direction from the fluid operated systems.

10. An apparatus, as set forth in claim 8, wherein said discharge valve means includes an outlet check valve formed in said outlet portion around the circumference of a control element longitudinally-movable between a first and a second position defined by a first and a second end stop of a valve chamber formed in said outlet portion, said discharge valve means further including a throttle passageway formed adjacent said valve chamber, the communication of compressed fluid therethrough being controlled by such movement of said control element.

11. An apparatus, as set forth in claim 10, wherein said outlet check valve includes a second sealing lip surrounding a portion of said control element and deflectable under the influence of such operating compressed fluid such that an open condition exists to the compressed fluid operated systems, said second sealing lip further being reflectable to contact said valve chamber when such operating compressed fluid is interrupted.

12. An apparatus, as set forth in claim 11, wherein said discharge valve means further includes a biasing spring engaging said control element such that said control element is urged in such first direction which is the direction of flow of such operating compressed fluid in such normal operating phase; said biasing spring being compressed upon interruption of such operating compressed fluid when such regenerative fluid urges said control element to such second position, such second control element position corresponding to an open condition of said throttle passageway, under which condition such regenerative fluid can flow to said drying material portion; said control element being held in such second position only when such regenerative fluid exceeds a predetermined value corresponding to a minimum pressure in the compressed fluid operated systems; when such regenerative fluid reaches such predetermined value, said control element resumes such first position thereby maintaining such minimum pressure and effecting a standby phase.

* * * * *

UNITED STATES PATENT AND TRADEMARK OFFICE
CERTIFICATE OF CORRECTION

PATENT NO.   :   4,755,196
DATED        :   July 5, 1988
INVENTOR(S)  :   Josef Frania, Wilhelm Haak & Erich Seewald It is certified that error appears in the above-identified patent and that said Letters Patent are hereby corrected as shown below:

Column 6, line 65, after "portion", delete the ","

Signed and Sealed this

Thirteenth Day of December, 1988

Attest:

DONALD J. QUIGG

Attesting Officer    Commissioner of Patents and Trademarks